US012380846B2

(12) United States Patent
Tian

(10) Patent No.: US 12,380,846 B2
(45) Date of Patent: Aug. 5, 2025

(54) LUMINANCE COMPENSATION METHOD AND DEVICE, READABLE STORAGE MEDIUM, AND DISPLAY DEVICE

(71) Applicant: Shenzhen China Star Optoelectronics Semiconductor Display Technology Co., Ltd., Guangdong (CN)

(72) Inventor: Fan Tian, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/790,165

(22) PCT Filed: May 26, 2022

(86) PCT No.: PCT/CN2022/095097
§ 371 (c)(1),
(2) Date: Jun. 30, 2022

(87) PCT Pub. No.: WO2023/216321
PCT Pub. Date: Nov. 16, 2023

(65) Prior Publication Data
US 2024/0212600 A1 Jun. 27, 2024

(30) Foreign Application Priority Data
May 13, 2022 (CN) ......................... 202210521653.9

(51) Int. Cl.
*G09G 3/3233* (2016.01)

(52) U.S. Cl.
CPC ... *G09G 3/3233* (2013.01); *G09G 2320/0233* (2013.01); *G09G 2320/043* (2013.01);
(Continued)

(58) Field of Classification Search
CPC ......... G09G 3/3233; G09G 2320/0233; G09G 2320/043; G09G 2320/0626; G09G 2360/16
See application file for complete search history.

(56) References Cited

U.S. PATENT DOCUMENTS 11,164,543 B1 * 11/2021 Gao ..................... G09G 3/2074
2017/0352310 A1 * 12/2017 Kim ..................... G09G 3/2003

FOREIGN PATENT DOCUMENTS

CN 103954898 7/2014
CN 109523955 3/2019
(Continued)

OTHER PUBLICATIONS

International Search Report and the Written Opinion Dated Dec. 16, 2022 From the International Searching Authority Re. Application No. PCT/CN2022/095097 and Its Translation Into English. (16 Pages).
(Continued)

*Primary Examiner* — Priyank J Shah

(57) ABSTRACT

The present disclosure provides a luminance compensation method and device therefor, a readable storage medium, and a display device, in the present disclosure, the luminance values of all the subpixels are obtained, and then the luminance value of the subpixel with the most serious aging degree among all the subpixels, that is, the minimum luminance value is obtained. Then, the minimum luminance value is compared with the standard luminance value to obtain the compensated luminance value, and then the compensated luminance value is used to drive all the subpixels, so that the uniformity of the luminance of the display device is improved.

17 Claims, 6 Drawing Sheets

(52) U.S. Cl.
CPC ............... *G09G 2320/0626* (2013.01); *G09G 2330/021* (2013.01); *G09G 2360/16* (2013.01)

(56) References Cited

FOREIGN PATENT DOCUMENTS

| | | |
|---|---|---|
| CN | 110808006 | 2/2020 |
| CN | 110827751 | 2/2020 |
| CN | 110875023 | 3/2020 |
| CN | 111402797 | 7/2020 |
| CN | 111554238 | 8/2020 |
| CN | 111986618 | 11/2020 |
| CN | 112102775 | 12/2020 |
| CN | 112289263 | 1/2021 |
| CN | 112447134 | 3/2021 |
| CN | 112689868 | 4/2021 |
| CN | 114141190 | 3/2022 |

OTHER PUBLICATIONS

Notification of Office Action and Search Report Dated Apr. 28, 2023 FromThe State Intellectual Property Office of the People's Republic of China Re. Application No. 202210521653.9 and Its Translation Into English. (22 Pages).

* cited by examiner

LUMINANCE COMPENSATION METHOD AND DEVICE, READABLE STORAGE MEDIUM, AND DISPLAY DEVICE

RELATED APPLICATIONS

This application is a National Phase of PCT Patent Application No. PCT/CN2022/095097 having International filing date of May 26, 2022, which claims the benefit of priority of China Patent Application No. 202210521653.9 filed on May 13, 2022. The contents of the above applications are all incorporated by reference as if fully set forth herein in their entirety.

FIELD AND BACKGROUND OF THE INVENTION

The present disclosure relates to a field of display technology, in particular to a luminance compensation method and device thereof, a readable storage medium, and a display device.

An Organic Light Emitting Diode (OLED) is a current-type organic light emitting device that emits light through the injection and recombination of carriers, and the emission intensity is proportional to the injected current. Under the action of the electric field, holes generated by an anode and electrons generated by a cathode in OLED are moved, injected into a hole transport layer and an electron transport layer, respectively, and migrated to a light emitting layer. When the holes and the electrons meet at the light emitting layer, energy excitons are generated, thereby exciting the light emitting molecules to eventually emit visible light. At present, the OLED display panel has been applied to the display field of a mobile phone, a tablet, and the like.

For OLED display panels, the luminous efficiency of the OLED will decrease over use time, that is, the luminance will decrease under the same driving current, and at the same time, due to the difference in the degree of aging of an OLED device of each pixel, the unevenness of luminance and the unevenness of chromaticity will be caused. However, the existing compensation method is to compensate the luminance of the OLED by increasing the current, and the existing compensation method may consume the life of the OLED in advance, and not fundamentally increase the life of the OLED device, but accelerate the aging of the device.

SUMMARY OF THE INVENTION

The present disclosure provides a luminance compensation method and device therefor, a readable storage medium, and a display device, so as to solve the problems of uneven luminance and accelerated aging of the display device.

The present disclosure provides a luminance compensation method including following steps:

- obtaining a luminance value of each of all subpixels when operation time is t;
- obtaining a minimum luminance value among luminance values of all the subpixels;
- obtaining a standard luminance value of the subpixels when the operation time is t;
- comparing the minimum luminance value with the standard luminance value to obtain a compensated luminance value;
- driving all the subpixels according to the compensated luminance value.

Optionally, in some embodiments of the present disclosure, the step of obtaining the luminance value of the each of all the subpixels when the operation time is t includes following steps:

- dividing the operation time t of a subpixel into N time periods, wherein N is greater than or equal to 1;
- obtaining a driving current value I of the subpixel in each of the time periods, and obtaining a total of N driving current values of the subpixel in the N time periods, which are respectively $I_1$, $I_2$, . . . and $I_N$;
- converting the N driving current values into current stress values to obtain N current stress values, which are respectively $stress_{I1}$, $stress_{I2}$, . . . and $stress_{IN}$;

- $stress_{IN}=\alpha\times stress_{ref}$, wherein $stress_{ref}$ is a corresponding current stress value of the subpixel at a reference current $I_{ref}$, $\alpha=I_N/I_{ref}$ or $\alpha=(I_N/I_{ref})^b$, b is a characteristic parameter of an organic light emitting device of the subpixel;
- adding the N current stress values to obtain an accumulated value $sum_{stress}$;
- obtaining a luminance value L of the subpixel according to the accumulated value $sum_{stress}$ $$L = e^{-\left(\frac{sum_{stress}}{\tau}\right)^{\beta}} \times L_0,$$

- wherein $L_0$ is an initial luminance value of the subpixel, and β and ρ are characteristic parameters of the organic light emitting device of the subpixel.

Optionally, in some embodiments of the present disclosure, the step of obtaining the driving current value I of the subpixel in the each of the time periods includes:

- obtaining M driving current values of the subpixel in the each of the time periods, wherein M is greater than or equal to 1;
- obtaining an average driving current value of the M driving current values as the driving current value I of the subpixel in the each of the time periods.

Optionally, in some embodiments of the present disclosure, the step of obtaining the luminance value of the each of all the subpixels when the operation time is t includes:

- obtaining a driving electrical performance parameter of the subpixel;
- obtaining a luminance value L of the subpixel according to the driving electric performance parameter, $$L = (c \times P + d) \times L_0$$

- where $L_0$ is an initial luminance value of the subpixel, P is the driving electrical performance parameter, and c and d are characteristic parameters of the organic light emitting device of the subpixel Optionally, in some embodiments of the present disclosure, the step of obtaining the standard luminance value of the subpixels when the operation time is t includes:

- establishing a standard luminance curve of subpixels, the standard luminance curve being a graph of standard luminance and operation time T of the subpixel;
- obtaining the standard luminance value of the subpixels according to the standard luminance curve when the operation time is t.

Optionally, in some embodiments of the present disclosure, the step of comparing the minimum luminance value with the standard luminance value to obtain the compensated luminance value includes:

comparing the minimum luminance value with the standard luminance value;

if the minimum luminance value is less than or equal to the standard luminance value, taking the standard luminance value as the compensated luminance value;

if the minimum luminance value is greater than the standard luminance value, taking the minimum luminance value as the compensated luminance value.

Optionally, in some embodiments of the present disclosure, the step of comparing the minimum luminance value with the standard luminance value to obtain the compensated luminance value includes:

comparing the minimum luminance value with the standard luminance value;

if the minimum luminance value is less than or equal to the standard luminance value, taking the standard luminance value as the compensated luminance value;

if the minimum luminance value is greater than the standard luminance value, obtaining a maximum luminance value among the luminance values of all the subpixels, and taking the maximum luminance value as the compensated luminance value.

Optionally, in some embodiments of the present disclosure, the step of driving all the subpixels according to the compensated luminance value includes:

obtaining a compensation coefficient α according to a ratio between the compensated luminance value and the luminance value of the subpixel, $\alpha=L_t/L$, wherein $L_t$ is the compensated luminance value, and L is the luminance value of the subpixel;

obtaining a driving electrical performance parameter of the subpixel when the operation time is t;

multiplying the compensation coefficient and the driving electrical performance parameter to obtain a compensated driving electrical performance parameter;

adjusting a value of the driving electric performance parameter of the subpixel to a value of the compensated driving electric performance parameter.

Optionally, in some embodiments of the present disclosure, the driving electric performance parameter includes any one of a driving voltage and a driving current of the subpixel.

Accordingly, the present disclosure further provides a luminance compensation device including:

a luminance-obtaining module configured to obtain a luminance value of each of all subpixels when operation time is t;

a luminance comparison module configured to obtain a minimum luminance value among luminance values of all the subpixels;

a standard luminance module configured to obtain a standard luminance value of the subpixels when the operation time is t;

a compensation module configured to compare the minimum luminance value with the standard luminance value to obtain a compensated luminance value;

a drive module configured to drive all the subpixels according to the compensated luminance value.

Accordingly, the present disclosure further provides a readable storage medium, a computer program executable in a processor is stored in the readable storage medium, and the processor executes the computer program to implement steps of a luminance compensation method including:

obtaining a luminance value of each of all subpixels when operation time is t;

obtaining a minimum luminance value from luminance values of all the subpixels;

obtaining a standard luminance value of the subpixels when the operation time is t;

comparing the minimum luminance value with the standard luminance value to obtain a compensated luminance value; and driving all the subpixels according to the compensated luminance value.

Accordingly, the present disclosure further provides a display device including a processor, a memory, and a computer program stored in the memory and executable in the processor, the processor executes the computer program to implement steps of the luminance compensation method including:

obtaining a luminance value of each of all subpixels when operation time is t;

obtaining a minimum luminance value from luminance values of all the subpixels;

obtaining a standard luminance value of the subpixels when the operation time is t;

comparing the minimum luminance value with the standard luminance value to obtain a compensated luminance value; and driving all the subpixels according to the compensated luminance value.

Optionally, in some embodiments of the present disclosure, the step of obtaining the luminance value of the each of all the subpixels when the operation time is t includes following steps:

dividing the operation time t of a subpixel into N time periods, wherein N is greater than or equal to 1;

obtaining a driving current value I of the subpixel in each of the time periods, and obtaining a total of N driving current values of the subpixel in the N time periods, which are respectively $I_1$, $I_2$, . . . and $I_N$;

converting the N driving current values into current stress values to obtain N current stress values, which are respectively $stress_{I1}$, $stress_{I2}$, . . . and $stress_{IN}$;

$stress_{IN}=\alpha\times stress_{ref}$, wherein $stress_{ref}$ is a current stress value of the subpixel at a reference current $I_{ref}$, $\alpha=I_N/I_{ref}$ or $\alpha=(I_N/I_{ref})^b$, b is a characteristic parameter of an organic light emitting device of the subpixel;

adding the N current stress values to obtain an accumulated value $sum_{stress}$; and obtaining a luminance value L of the subpixel according to the accumulated value $sum_{stress}$, $$L=e^{-\left(\frac{sum_{stress}}{\tau}\right)^{\beta}}\times L_0,$$

wherein $L_0$ is an initial luminance value of the subpixel, and β and ρ are characteristic parameters of the organic light emitting device of the subpixel.

Optionally, in some embodiments of the present disclosure, the step of obtaining the driving current value I of the subpixel in the each of the time periods includes:

obtaining M driving current values of the subpixel in the each of the time periods, wherein M is greater than or equal to 1; and obtaining an average driving current value of the M driving current values as the driving current value I of the subpixel in the each of the time periods.

Optionally, in some embodiments of the present disclosure, the step of obtaining the luminance value of the each of all the subpixels when the operation time is t includes:

obtaining a driving electrical performance parameter of the subpixel; and obtaining a luminance value L of the subpixel according to the driving electric performance parameter, $$L=(c\times P+d)\times L_0$$

where $L_0$ is an initial luminance value of the subpixel, P is the driving electrical performance parameter, and c and d are characteristic parameters of the organic light emitting device of the subpixel.

Optionally, in some embodiments of the present disclosure, the step of obtaining the standard luminance value of the subpixels when the operation time is t includes:

establishing a standard luminance curve of subpixels, the standard luminance curve being a graph of standard luminance and operation time T of the subpixels; and obtaining the standard luminance value of the subpixels according to the standard luminance curve when the operation time is t.

Optionally, in some embodiments of the present disclosure, the step of comparing the minimum luminance value with the standard luminance value to obtain the compensated luminance value includes:

comparing the minimum luminance value with the standard luminance value;

if the minimum luminance value is less than or equal to the standard luminance value, taking the standard luminance value as the compensated luminance value;

if the minimum luminance value is greater than the standard luminance value, taking the minimum luminance value as the compensated luminance value.

Optionally, in some embodiments of the present disclosure, the step of comparing the minimum luminance value with the standard luminance value to obtain the compensated luminance value includes:

comparing the minimum luminance value with the standard luminance value;

if the minimum luminance value is less than or equal to the standard luminance value, taking the standard luminance value as the compensated luminance value;

if the minimum luminance value is greater than the standard luminance value, obtaining a maximum luminance value among the luminance values of all the subpixels, and taking the maximum luminance value as the compensated luminance value.

Optionally, in some embodiments of the present disclosure, the step of driving all the subpixels according to the compensated luminance value includes:

obtaining a compensation coefficient α according to a ratio between the compensated luminance value and the luminance value of the subpixel;

$\alpha=L_t/L$, wherein $L_t$ is the compensated luminance value, and L is the luminance value of the subpixel;

obtaining a driving electrical performance parameter of the subpixel when the operation time is t;

multiplying the compensation coefficient and the driving electrical performance parameter to obtain a compensated driving electrical performance parameter;

adjusting a value of the driving electric performance parameter of the subpixel to a value of the compensated driving electric performance parameter.

Optionally, in some embodiments of the present disclosure, the driving electric performance parameter includes any one of a driving voltage and a driving current of the subpixel.

The present disclosure provides a luminance compensation method and device therefor, a readable storage medium, and a display device, wherein the luminance compensation method includes: obtaining a luminance value of each of all subpixels when operation time is t; obtaining a minimum luminance value among luminance values of all the subpixels; obtaining a standard luminance value of the subpixels when the operation time is t; comparing the minimum luminance value with the standard luminance value to obtain a compensated luminance value; driving all the subpixels according to the compensated luminance value. In the present disclosure, the luminance values of all the subpixels are obtained, and then the luminance value of the subpixel with the most serious aging degree among all the subpixels, that is, the minimum luminance value is obtained. Then, the minimum luminance value is compared with the standard luminance value to obtain the compensated luminance value, and then the compensated luminance value is used to drive all the subpixels, so that the uniformity of the luminance of the display device is improved, the aging speed of the display device is reduced, and the lifespan is prolonged.

BRIEF DESCRIPTION OF THE SEVERAL VIEWS OF THE DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DESCRIPTION OF SPECIFIC EMBODIMENTS OF THE INVENTION

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it is to be understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

The present disclosure provides a luminance compensation method and device, a readable storage medium, and a display device, which are described in detail below. It should be noted that the luminance compensation method provided in an embodiment of the present disclosure may be applied to a display device having the following structure: the display device is a self-emitting display device, for example, an OLED display device, the display device includes a plurality of subpixels, and each subpixel includes an organic light emitting device. The order of description of the following embodiments is not intended to limit the preferred order of the embodiments of this disclosure.

Figure 1:
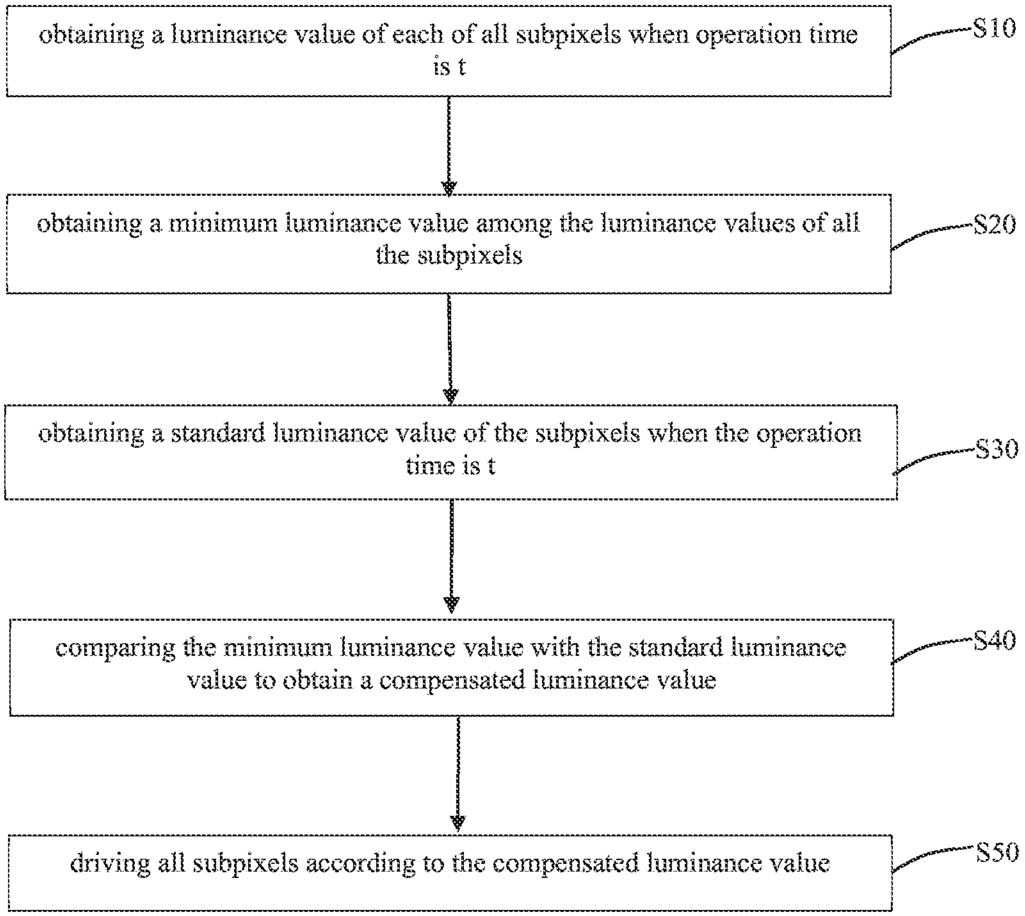
FIG. 1 is a flowchart of a luminance compensation method according to the present disclosure.

Referring to FIG. 1, FIG. 1 is a flowchart of a luminance compensation method according to the present disclosure. The present disclosure provides a luminance compensation method including following steps:

S10: obtaining a luminance value of each of all subpixels when operation time is t.

As the use time of the OLED display panel increases, the luminous efficiency of the organic light emitting device of the OLED display panel decreases, that is, under the same driving current, the luminance of the organic light emitting device will decrease, that is, the organic light emitting device deteriorates. Therefore, luminance values of the subpixels at different operation times are obtained, and the luminance values may reflect the aging degree of the organic light emitting device. In general, when the initial luminance of the subpixel of the OLED display panel is 1, that is, when the operation time is zero, the luminance value of the subpixel of the OLED display panel is 1. As the operation time increases, the luminance value of the subpixel of the OLED display panel will be less than 1, and is in a range of 0 to 1.

S20: obtaining a minimum luminance value among the luminance values of all the subpixels.

Figure 2:
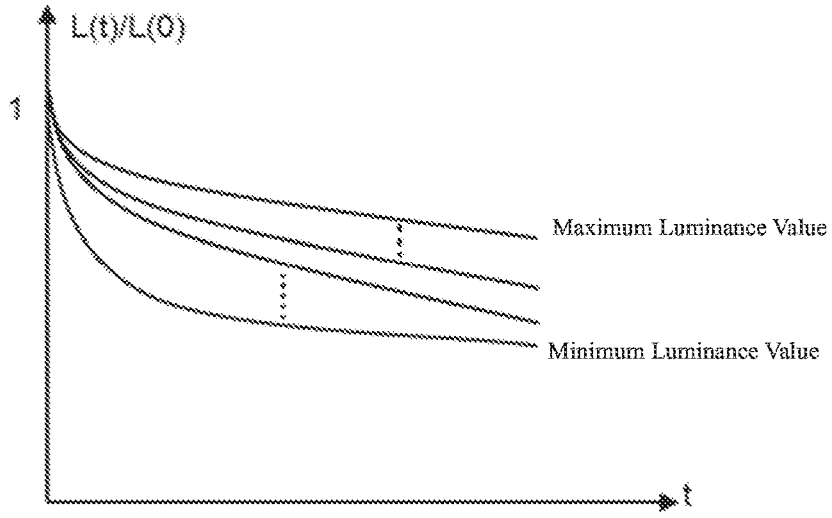
FIG. 2 is an actual luminance graph of a subpixel.

After obtaining the luminance value of each of all the subpixels of the OLED display panel when the operation time is t, the minimum luminance value among the luminance values of all the subpixels is obtained by comparing the luminance values of all the subpixels. Referring to FIG. 2, FIG. 2 is an actual luminance value graph of a subpixel. The actual luminance value graph may be formed by accumulating the luminance values of each subpixel each time.

S30: obtaining a standard luminance value of all the subpixels when the operation time is t.

Specifically, the subpixels include red light subpixels, green light subpixel, blue light subpixels, and white light pixels, and correspondingly, a standard luminance value of the subpixel may be any one of a standard luminance value of the red light subpixel, a standard luminance value of the green light subpixel, a standard luminance value of the blue light subpixel, and a standard luminance value of the white light subpixel, or the red light subpixel, the green light subpixel, the blue light subpixel, and the white light subpixel adopt a common standard luminance value, and the standard luminance value of the subpixel may be set according to specific needs. As the use time of the OLED display panel increases, the luminous efficiency of the organic light emitting device of the OLED display panel will decrease. That is, under the same driving current, the luminance of the organic light emitting device will decrease, that is, the organic light emitting device will age. Therefore, in order to reflect a standard aging condition of the organic light emitting device, when the operation time of the organic light emitting device is t, the organic light emitting device has a corresponding standard luminance value under the same driving current. When the operation time is t, if the luminance value of the subpixel is greater than the standard luminance value, it indicates that the aging speed of the subpixel is slower than a standard aging speed, and if the luminance value of the subpixel is less than the standard luminance value, it indicates that the aging speed of the subpixel is faster than the standard aging speed.

S40: comparing the minimum luminance value with the standard luminance value to obtain a compensated luminance value.

The aging condition of the subpixels of the OLED display panel is obtained by comparing the minimum luminance value with the standard luminance value. The compensated luminance value is then determined according to the aging condition.

S50: driving all subpixels according to the compensated luminance value.

As can be seen from the above, the initial luminance of the subpixel of the OLED display panel is 1, the compensated luminance value is located in the range of 0 to 1, and the subpixel may be driven by converting the compensated luminance value into a driving electric performance parameter, and then setting the driving electric performance parameter as an electric performance parameter of the subpixel. Since all subpixels are driven with the compensated luminance value, the luminance of the OLED display panel is uniform. At the same time, all subpixels are driven according to the compensated luminance value in the present disclosure, and the luminance uniformity of the OLED display pane are not simply improved by increasing the driving current of the subpixels, thereby reducing the aging speed of the display device and prolonging the lifespan.

It should be noted that, in the above process, steps S10, S20, S30, S40, and S50 are used to describe the process of the luminance compensation method according to the present disclosure only to facilitate the understanding of the method process, and not to limit the specific step sequence of the luminance compensation method according to the present disclosure. The luminance compensation method according to the present disclosure may have other step sequences that may achieve the object of the present disclosure, and are not limited herein.

Figure 3:
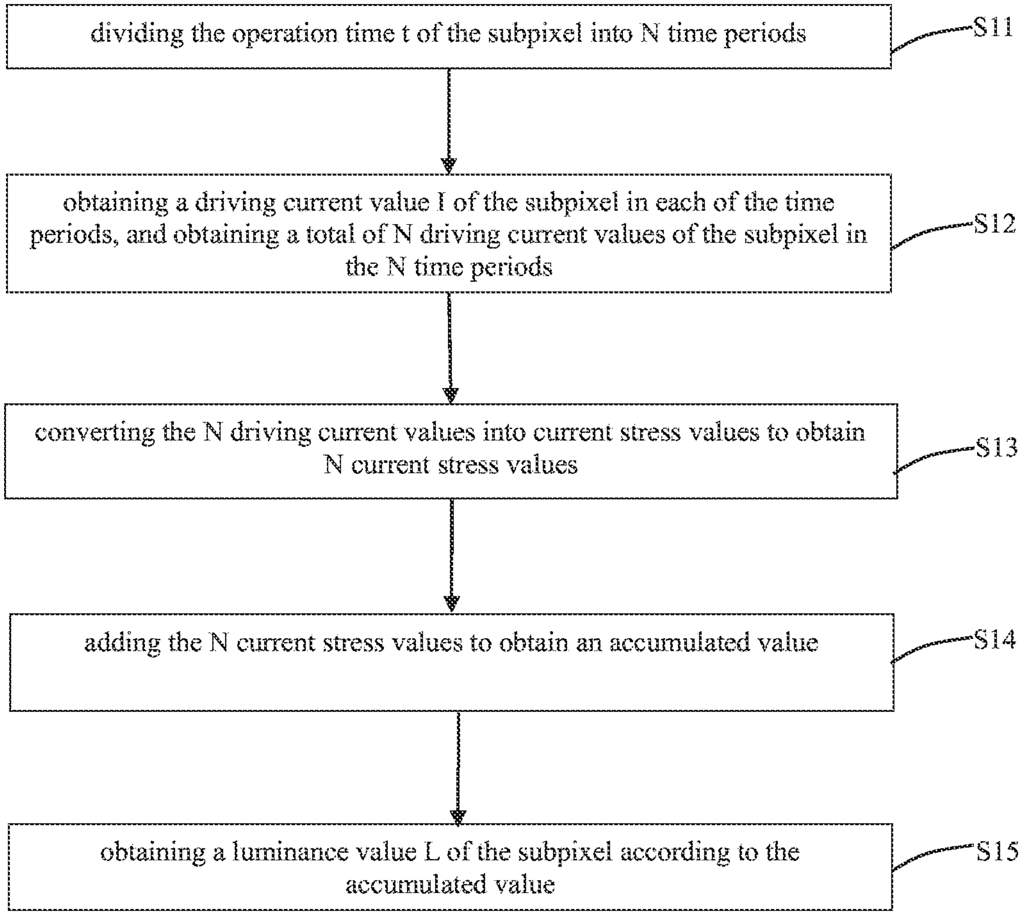
FIG. 3 is a flowchart of a first embodiment of step S10 of the luminance compensation method according to the present disclosure.

In some embodiments, referring to FIG. 3, FIG. 3 is a flowchart of a first embodiment of step S10 of the luminance compensation method according to the present disclosure. The step S10 includes:

S11: dividing the operation time t of the subpixel into N time periods, and N is greater than or equal to 1.

The operation time t of the subpixel is divided into N time periods. The N time periods may be N time periods of equal duration, or may be N time periods of unequal duration, or the N time periods may include a plurality of time periods of equal duration.

S12: obtaining a driving current value I of the subpixel in each of the time periods, and obtaining a total of N driving current values of the subpixel in the N time periods, which are respectively $I_1$, $I_2$, . . . and $I_N$;

S13: converting the N driving current values into current stress values to obtain N current stress values, which are respectively $stress_{I1}$, $stress_{I2}$, . . . and $stress_{IN}$;

$stress_{IN}=\alpha\times stress_{ref}$, wherein $stress_{ref}$ is a corresponding current stress value of the subpixel at the reference current $I_{ref}$, $\alpha=I_N/I_{ref}$ or $\alpha=(I_N/I_{ref})^b$, b is a characteristic parameter of the organic light emitting device of the subpixel;

S14: adding the N current stress values to obtain an accumulated value $sum_{stress}$.

S15: obtaining a luminance value L of the subpixel according to the accumulated value $sum_{stress}$.

$$L = e^{-\left(\frac{sum_{stress}}{\tau}\right)^{\beta}} \times L_0,$$

wherein $L_0$ is an initial luminance value of the subpixel, β and ρ are characteristic parameters of the organic light emitting device of the subpixel.

The step S10 is illustrated below by taking the N time periods that may be N time periods of equal duration as an example: the operation time t is 150 hours, and the 150 hours are divided into ten equal time periods. The ten time periods are: a first time period is from 0 to 15th hours, a second time period is from 15th to 30th hours, a third time period is from 30th to 45th hours, a fourth time period is from 45th to 60th hours, a fifth time period is from 60th to 75th hours, a sixth time period is from 75th to 90th hours, a seventh time period is from 90th to 105th hours, an eighth time period is from 105th to 120th hours, a ninth time period is from 120th to 135th hours, and a tenth time period is from 135th to 150th hours. That is, the driving current value I of the subpixel in each of the time periods is obtained, there are N driving current values in N time periods in total, and then a driving current value $I_1$ of the subpixel in the first time period, a driving current value $I_2$ in the second time period, and a driving current value $I_3$ in the third time period, a driving current value $I_4$ in the fourth time period, a driving current value $I_5$ in the fifth time period, a driving current value $I_6$ in the sixth time period, a driving current value $I_7$ in the seventh time period, a driving current value $I_8$ in the eighth time period, a driving current value $I_9$ in the ninth time period, and a driving current value $I_{10}$ in the tenth time period are obtained. The above 10 drive current values are converted into current stress values to obtain 10 current stress values, which are $stress_{I1}$, $stress_{I2}$, $stress_{I3}$, $stress_{I4}$, $stress_{I5}$, $stress_{I6}$, $stress_{I7}$, $stress_{I8}$, $stress_{I9}$, $stress_{I10}$, respectively. The 10 current stress values are added to obtain an accumulated value, and in this case, $sum_{stress}=stress_{I1}+stress_{I2}+stress_{I3}+stress_{I4}+stress_{I5}+stress_{I6}+stress_{I7}+stress_{I8}+stress_{I9}+stress_{I10}$.

Finally, since the initial luminance of the subpixel of the OLED display panel is 1, the luminance value L of the subpixel is:

$$L = e^{-\left(\frac{sum_{stress}}{\tau}\right)^{\beta}}.$$

Figure 4:
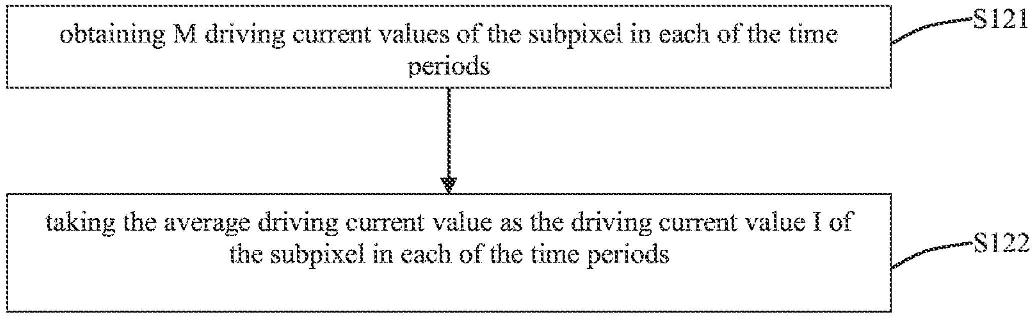
FIG. 4 is a flowchart of step S12 of the luminance compensation method according to the present disclosure.

In some embodiments, referring to FIG. 4, FIG. 4 is a flowchart of step S12 of the luminance compensation method according to the present disclosure, the step S12 includes:

S121: obtaining M driving current values of the subpixel in each of the time periods, wherein M is greater than or equal to 1; and S122: obtaining an average driving current value of the M driving current values, and taking the average driving current value as the driving current value I of the subpixel in each of the time periods.

When the operation time is 150 hours, 150 hours are divided into ten time periods of equal duration, 5 driving current values of the subpixel in the first time period are obtained, and then an average driving current value of the 5 driving current values is obtained. The average driving current value is the driving current value $I_1$ of the subpixel in the first time period, and similarly, the driving current values in the remaining time periods are obtained in the above manner. The accuracy of the driving current value may be improved by obtaining the M driving current values of the subpixels in each time period and then obtaining the average driving current value of the M driving current values. It should be noted that the value of M in each time period may be the same or different, and the value of M may be set in each time period according to actual needs.

Figure 5:
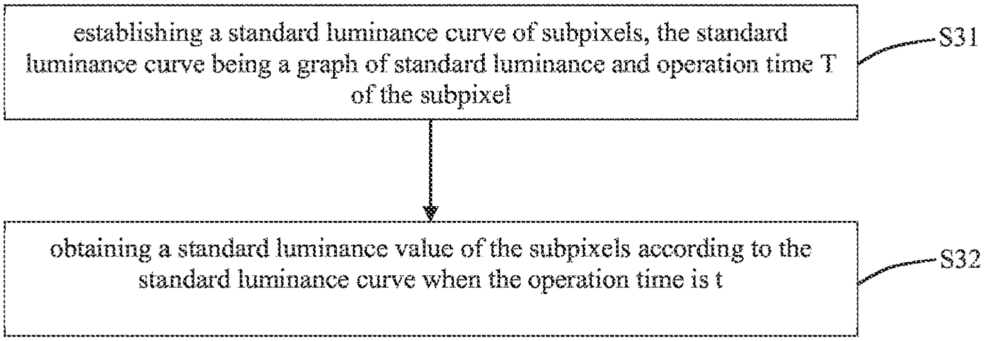
FIG. 5 is a flowchart of step S30 of the luminance compensation method according to the present disclosure.

In some embodiments, referring to FIG. 5, FIG. 5 is a flowchart of step S30 of the luminance compensation method according to the present disclosure, the step S30 includes:

S31: establishing a standard luminance curve of a subpixel, the standard luminance curve being a curve of standard luminance and operation time T of the subpixel;

S32: obtaining a standard luminance value of the subpixels according to the standard luminance curve when the operation time is t.

Figure 6:
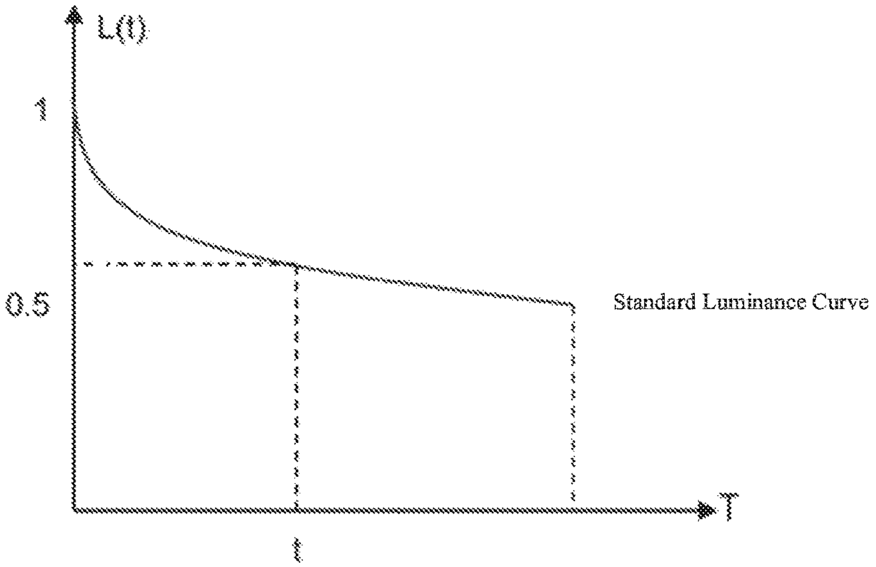
FIG. 6 is a standard luminance graph of a subpixel.

Specifically, the standard luminance curve of the subpixel includes any one of a standard luminance curve of the red light subpixel, a standard luminance curve of the green light subpixel, a standard luminance curve of the blue light subpixel, and a standard luminance curve of the white light subpixel, or may be a common standard luminance curve for the red light subpixel, the green light subpixel, the blue light subpixel, and the white light subpixel. Referring to FIG. 6, FIG. 6 is a standard luminance graph of a subpixel. The standard luminance curve shows a process in which the standard luminance of the subpixel gradually decreases as the operation time increases. The standard luminance curve may be stored in a memory of the display device before delivery, and the standard luminance curve may also be stored in a server or a cloud. In some embodiments, the luminance compensation method provided further includes the step of establishing a standard luminance curve of the subpixel, and this step includes the following steps: testing the standard luminance of the subpixel at different operation times to obtain at least two groups of corresponding relationship data between the operation times and the standard luminance values; obtaining a standard luminance curve by fitting according to the at least two groups of the corresponding relationship data between the operation times and the standard luminance values obtained by testing. Wherein the fitting is a primary function fitting. The number of groups of the corresponding relationship data between the operation times and the standard luminance values obtained by the test may be set according to actual needs. The more the number of groups, the more accurate the finally obtained standard luminance curve is. When it is necessary to obtain the standard luminance value of the subpixel when the operation time is t, it is only necessary to find the corresponding standard luminance value on the standard luminance curve according to the operation time of t.

Figure 7:
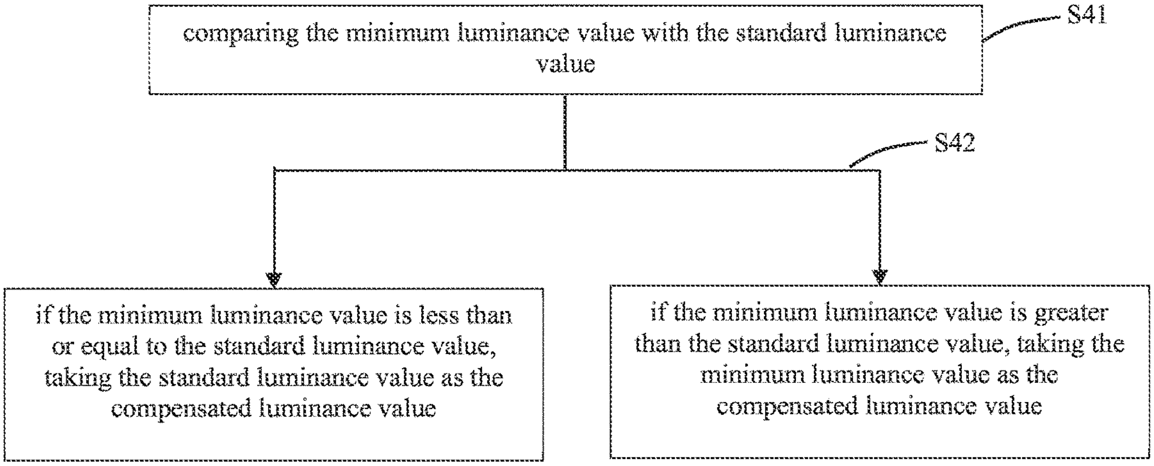
FIG. 7 is a flowchart of a first embodiment of step S40 of the luminance compensation method according to the present disclosure.

In some embodiments, referring to FIG. 7, FIG. 7 is a flowchart of a first embodiment of step S40 of the luminance compensation method according to the present disclosure, and the step S40 includes:

S41: comparing the minimum luminance value with the standard luminance value;

S42: if the minimum luminance value is less than or equal to the standard luminance value, taking the standard luminance value as the compensated luminance value; and if the minimum luminance value is greater than the standard luminance value, taking the minimum luminance value as the compensated luminance value.

Figure 8:
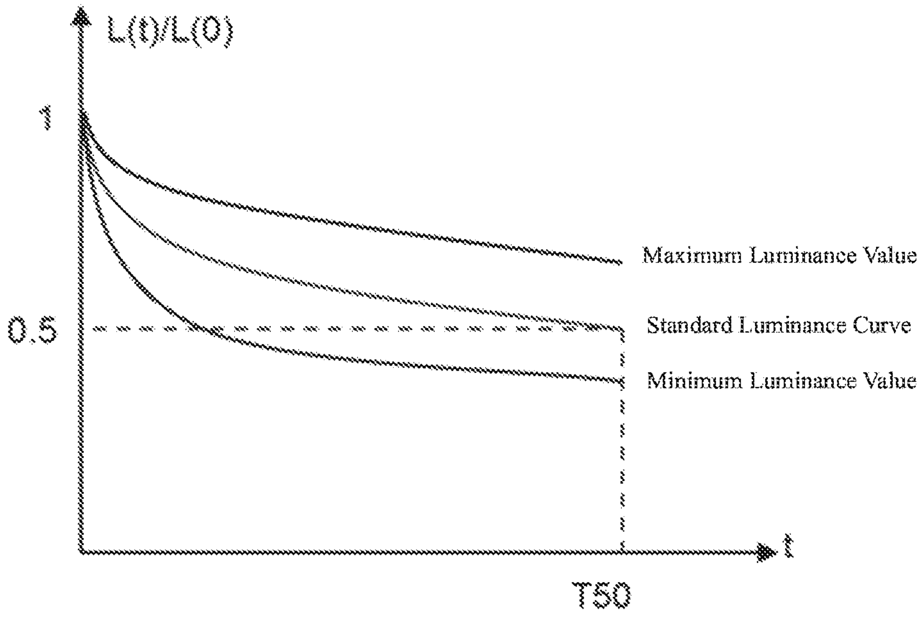
FIG. 8 is a schematic diagram of a minimum luminance value smaller than a standard luminance value.
Figure 9:
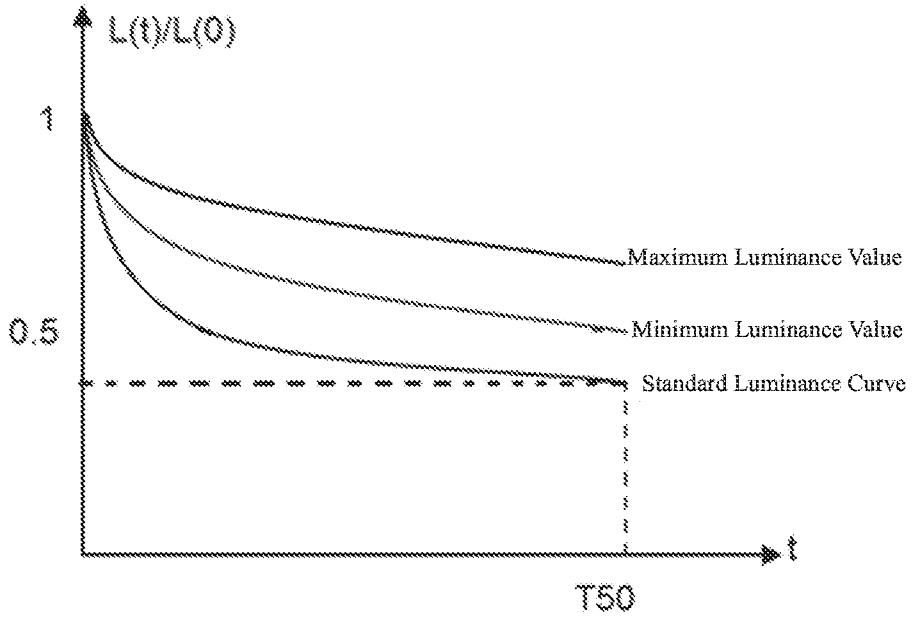
FIG. 9 is a schematic diagram of a minimum luminance value greater than a standard luminance value.

Please refer to FIG. 8 and FIG. 9. FIG. 8 is a schematic diagram in which the minimum luminance value is smaller than the standard luminance value, and FIG. 9 is a schematic diagram in which the minimum luminance value is larger than the standard luminance value. If the minimum luminance value is less than or equal to the standard luminance value, the compensation is performed with the standard luminance value as the compensated luminance value, and the actual lifespan curve of the OLED display panel after the compensation may reach the established lifespan specification. When the minimum luminance value is larger than the standard luminance value and the minimum luminance value is higher than the standard luminance value, if the compensated luminance value is selected according to the standard luminance curve at this time, the actual lifespan at this time is a lifespan curve just satisfying the lifetime specification. Although the lifespan specification may be satisfied, the compensation effect at this time is not optimal. Therefore, when the minimum luminance value of the subpixels of the OLED display panel is higher than the standard luminance value, the minimum luminance value of the current OLED display panel may be used as the compensated luminance value of the full compensation. At this time, the currents of the other subpixels except the subpixel with the minimum luminance value are reduced to achieve the target luminance. After the compensation, the luminance uniformity may be improved and the power consumption may be reduced, while the actual lifespan of the OLED display panel is higher than the standard lifespan specification.

Figure 10:
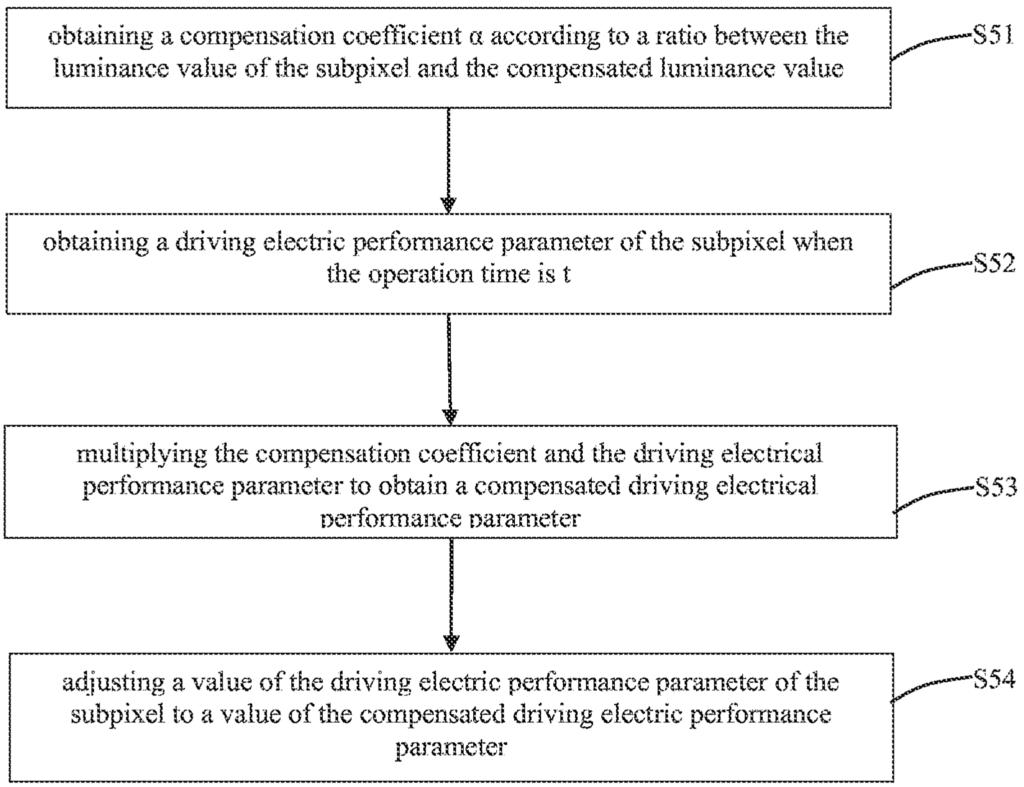
FIG. 10 is a flowchart of step S50 of the luminance compensation method according to the present disclosure.

In some embodiments, please refer to FIG. 10, which is a flowchart of step S50 of the luminance compensation method according to the present disclosure, the step S50 includes:

S51: obtaining a compensation coefficient α according to a ratio between the luminance value of the subpixel and the compensated luminance value, $\alpha = L_r/L$, wherein $L_r$ is the compensated luminance value, and L is the luminance value of the subpixel;

S52: obtaining a driving electric performance parameter of the subpixel when the operation time is t;

S53: multiplying the compensation coefficient and the driving electrical performance parameter to obtain a compensated driving electrical performance parameter;

S54: adjusting a value of the driving electric performance parameter of the subpixel to a value of the compensated driving electric performance parameter.

After the compensated luminance value is obtained, the compensated luminance value and the luminance value of the subpixel are compared, and then the compensation coefficient is obtained, and then the driving electric performance parameter of the subpixel is obtained. Since there is a corresponding relationship between the driving electric performance parameter and the luminance value, the compensated electric performance parameter may be obtained by multiplying the compensation coefficient and the driving electric performance parameter, and finally the value of the driving electric performance parameter of the subpixel is adjusted to the value of the compensated electric performance parameter. At this time, the luminance value of the subpixel may reach the compensated luminance value, and all the subpixels of the OLED display panel are compensated in the above manner, so that all the subpixels of the OLED display panel have the same compensated luminance value, and the luminance of the OLED display panel is uniform.

Further, in some embodiments, the driving electrical performance parameter includes any one of a driving voltage and a driving current of the subpixel. Of course, it is easy to conceive that the driving electric performance parameter may be another parameter of the subpixel, for example, power, resistance, etc., but since the driving voltage and the driving current of the subpixel have a positive linear relationship with the luminance value of the subpixel, it may be easily set.

When the driving electric performance parameter is a driving current, the compensated driving electric performance parameter is a compensated driving current $I_r$, $I_r = \alpha \times I$, the compensation coefficient is obtained by the luminance value of the subpixel and the compensated luminance value, and the current is adjusted according to the compensation coefficient to compensate the luminance.

When the driving electric performance parameter is the driving voltage, the compensated driving electric performance parameter is the compensated driving voltage $V_r$. Firstly, a compensated driving current is obtained by the formula $I_r = \alpha \times I$, and then the compensated driving voltage is obtained according to the formula $I = k \times (Vgs - Vth)^2$, wherein Vgs is the voltage difference between the gate and the source of the transistor of the subpixel, and Vth is the threshold voltage of the transistor of the subpixel, thereby compensating the luminance.

Figure 11:
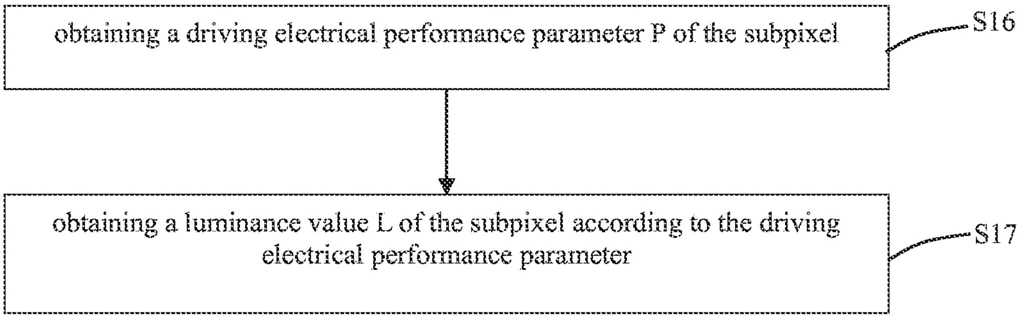
FIG. 11 is a flowchart of a second embodiment of step S10 of the luminance compensation method according to the present disclosure.

In other embodiments of the present disclosure, please refer to FIG. 11. FIG. 11 is a flowchart of a second embodiment of step S10 of the luminance compensation method according to the present disclosure. The step S10 includes:

S16: obtaining a driving electrical performance parameter of the subpixel;

S17: obtaining a luminance value L of the subpixel according to the driving electrical performance parameter, $$L = (c \times P + d) \times L_0$$

Wherein $L_0$ is an initial luminance value of the subpixel, P is a driving electrical performance parameter, and c and d are characteristic parameters of the organic light emitting device of the subpixel.

Further, the driving electric performance parameter includes any one of a driving voltage and a driving current of the subpixel, the initial luminance value of the subpixel is 1, and L=c×P+d. That is, in some embodiments of the present disclosure, after obtaining the driving electrical performance parameters of the subpixels, the luminance value of the subpixel may be calculated, and the process is efficient and convenient.

Figure 12:
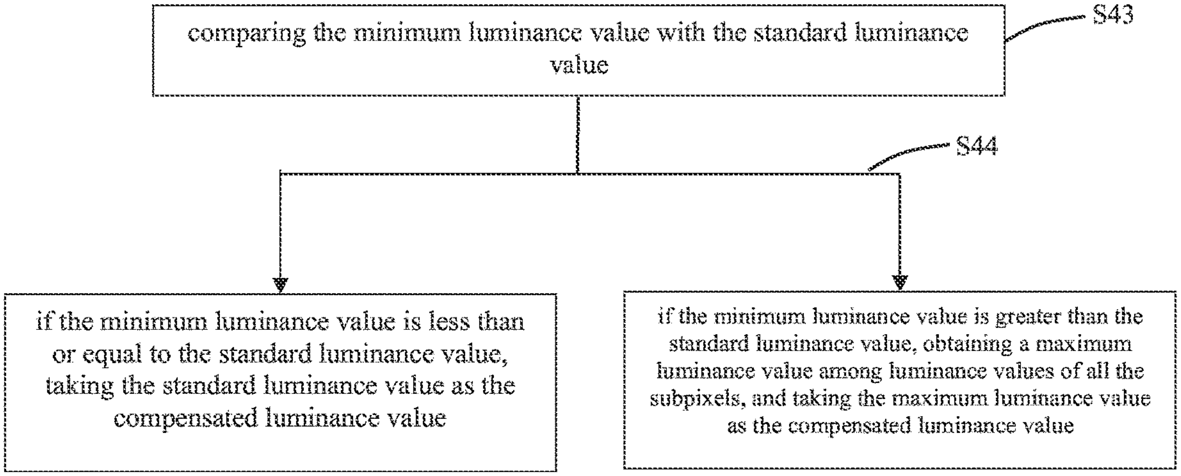
FIG. 12 is a flowchart of a second embodiment of step S40 of the luminance compensation method according to the present disclosure.

In other embodiments of the present disclosure, referring to FIG. 12, FIG. 12 is a flowchart of a second embodiment of a step S40 of a luminance compensation method according to the present disclosure. The step S40 includes:

S43: comparing the minimum luminance value with the standard luminance value;

S44: if the minimum luminance value is less than or equal to the standard luminance value, taking the standard luminance value as a compensated luminance value;

if the minimum luminance value is greater than the standard luminance value, obtaining a maximum luminance value among luminance values of all the subpixels, and taking the maximum luminance value as the compensated luminance value.

Referring to FIGS. 8 and 9, if the minimum luminance value is less than or equal to the standard luminance value, the compensation is performed with the standard luminance value as the compensated luminance value, and the actual lifespan curve of the OLED display panel after the compensation may reach the specified lifespan specification. If the minimum luminance value is larger than the standard luminance value and the minimum luminance value is higher than the standard luminance value, if the compensated luminance value is selected according to the standard luminance curve at this time, the actual lifespan at this time is a lifespan curve just satisfying the lifespan specification. Although the lifespan specification may be satisfied, the compensation effect at this time is not optimal. Therefore, when the minimum luminance value of the OLED display panel subpixels is higher than the standard luminance value, the maximum luminance value among the luminance values of all the subpixels is obtained, and the maximum luminance value of the current OLED display panel may be taken as the fully compensated luminance value. At this time, the currents of the other subpixels except the subpixel of the maximum luminance value are all increased to reach the target luminance, and the luminance uniformity may be improved after compensation, while the actual lifespan of the OLED display panel is higher than the standard lifespan specification.

Figure 13:
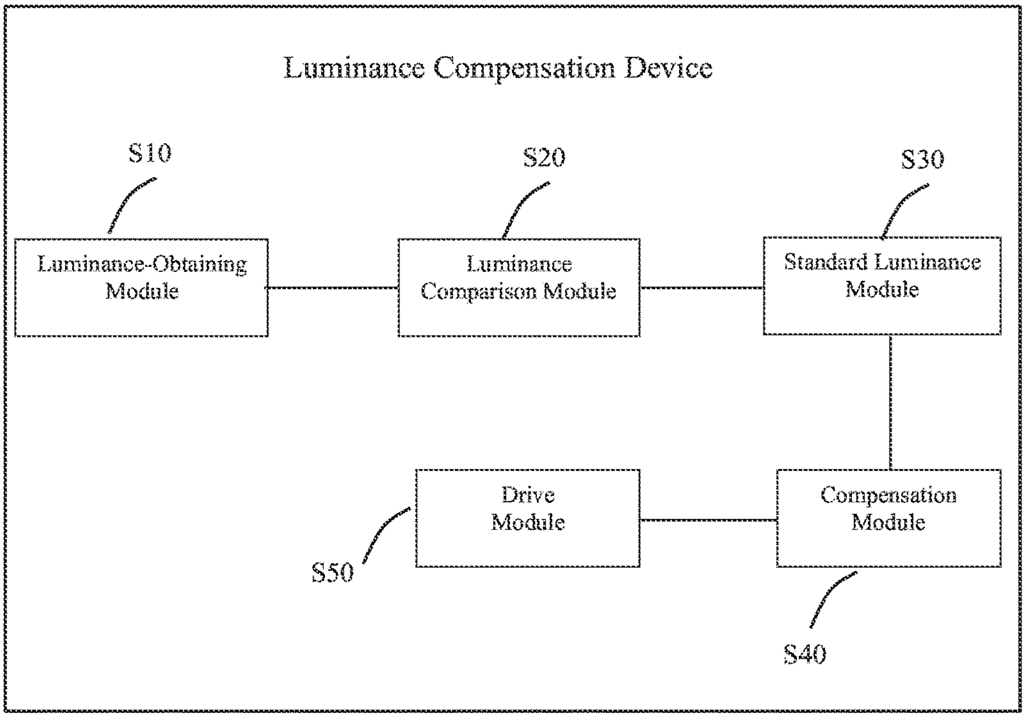
FIG. 13 is a schematic diagram of a luminance compensation device provided by the present disclosure.

Referring to FIG. 13, FIG. 13 is a schematic diagram of a luminance compensation device according to the present disclosure. An embodiment of the present disclosure further provides a luminance compensation device, which includes a luminance-obtaining module 10, a luminance comparison module 20, a standard luminance module 30, a compensation module 40, and a drive module 50.

Wherein the luminance-obtaining module 10 is configured to obtain luminance value of each of all subpixels when the operation time is t; the luminance comparison module 20 is configured to obtain a minimum luminance value among luminance values of all the subpixels; the standard luminance module 30 is configured to obtain a standard luminance value of the subpixel when the operation time is t; the compensation module 40 is configured to compare the minimum luminance value with the standard luminance value to obtain a compensated luminance value; and the driving module 50 is configured to drive all the subpixels according to the compensated luminance value.

All the subpixels of the present disclosure are driven with compensated luminance values, thereby making the luminance of the OLED display panel uniform. At the same time, in the present disclosure, all the subpixels are driven according to the compensated luminance value, and does not simply improve the luminance uniformity of the OLED display panel by increasing the driving current of the subpixels, thereby reducing the aging speed of the display device and prolonging the life.

Embodiments of the present disclosure further provide a readable storage medium storing a computer program executable in a processor that executes the computer program to implement the steps of the luminance compensation method described above. Preferably, the readable storage medium may include a computer readable storage medium such as a non-volatile memory or a non-transitory memory. The storage medium may include, but is not limited to, ROM, RAM, magnetic disks or optical disks, and the like.

Embodiments of the present disclosure further provide a display device including a processor, a memory, and a computer program stored in the memory and executable on the processor, the processor executes the computer program to implement the steps in the luminance compensation method described above.

Specifically, in the embodiments of the present disclosure, the processor may be a central processing unit (CPU for short), or may be another general purpose processor, a digital signal processor (DSP for short), an application specific integrated circuit (ASIC for short), a field programmable gate array (FPGA for short) or other programmable logic devices, discrete gate or transistor logic devices, discrete hardware components, etc. The general purpose processor may be a microprocessor, or may be any conventional processor or the like.

It should also be understood that the memory in the embodiments of the present disclosure may be volatile memory or non-volatile memory, or may include both the volatile memory and the non-volatile memory. The non-volatile memory may be read-only memory (ROM for short), programmable read-only memory (programmable ROM, PROM for short), erasable programmable read-only memory (erasable PROM, EPROM for short), electrically erasable programmable read-only memory (electrically EPROM, EEPROM for short), or flash memory. The volatile memory may be a random access memory (RAM for short), which serves as an external cache. By way of example but not limitation, many forms of random access memory (RAM for short) are available, such as static random access memory (static RAM, SRAM for short), dynamic random access memory (DRAM), synchronous dynamic random access memory (synchronous DRAM, SDRAM for short), double data rate synchronous dynamic random access memory (double data rate SDRAM, DDR SDRAM for short), enhanced synchronous dynamic random access memory (enhanced SDRAM, ESDRAM for short), synchronous connection dynamic random access memory (synchlink DRAM, SLDRAM for short), and direct rambus random access memory (direct rambus RAM, DRRAM for short).

A luminance compensation method and device therefor, a readable storage medium, and a display device provided in the embodiments of this disclosure are described in detail above. The principles and implementation of this disclosure are described by using specific examples in this disclosure. The description of the embodiments is merely intended to help understand the technical solutions and core ideas of the present application. Meanwhile, for those skilled in the art, according to the idea of the present disclosure, there will be some changes in specific embodiments and application scope. In conclusion, the contents of the present specification shall not be construed as limiting the present disclosure.

What is claimed is:

1. A luminance compensation method, wherein the luminance compensation method comprises following steps:

obtaining a luminance value of each of all subpixels when operation time is t;

obtaining a minimum luminance value from luminance values of all the subpixels;

obtaining a standard luminance value of the subpixels when the operation time is t;

comparing the minimum luminance value with the standard luminance value to obtain a compensated luminance value; and driving all the subpixels according to the compensated luminance value, wherein the step of obtaining the luminance value of the each of all the subpixels when the operation time is t comprises following steps:

dividing the operation time t of a subpixel into N time periods, wherein N is greater than or equal to 1;

obtaining a driving current value I of the subpixel in each of the time periods, and obtaining a total of N driving current values of the subpixel in the N time periods, which are respectively $I_1$, $I_2$, . . . and $I_N$;

converting the N driving current values into current stress values to obtain N current stress values, which are respectively $stress_{I1}$, $stress_{I2}$, . . . and $stress_{IN}$;

$stress_{IN}=\alpha\times stress_{ref}$, wherein $stress_{ref}$ is a current stress value of the subpixel at a reference current $I_{ref}$, $\alpha=I_N/I_{ref}$ or $\alpha=(I_N/I_{ref})^b$, b is a characteristic parameter of an organic light emitting device of the subpixel;

adding the N current stress values to obtain an accumulated value $sum_{stress}$; and obtaining a luminance value L of the subpixel according to the accumulated value $sum_{stress}$, $$L = e^{-\left(\frac{sum_{stress}}{\tau}\right)^{\beta}} \times L_0,$$

wherein $L_0$ is an initial luminance value of the subpixel, and $\beta$ and $\tau$ are characteristic parameters of the organic light emitting device of the subpixel.

2. The luminance compensation method according to claim 1, wherein the step of obtaining the driving current value I of the subpixel in the each of the time periods comprises:

obtaining M driving current values of the subpixel in the each of the time periods, wherein M is greater than or equal to 1; and obtaining an average driving current value of the M driving current values as the driving current value I of the subpixel in the each of the time periods.

3. The luminance compensation method according to claim 1, wherein the step of obtaining the luminance value of the each of all the subpixels when the operation time is t comprises:

obtaining a driving electrical performance parameter of the subpixel; and obtaining a luminance value L of the subpixel according to the driving electric performance parameter, $$L = (c \times P + d) \times L_0$$

where $L_0$ is an initial luminance value of the subpixel, P is the driving electrical performance parameter, and c and d are characteristic parameters of the organic light emitting device of the subpixel.

4. The luminance compensation method according to claim 1, wherein the step of obtaining the standard luminance value of the subpixels when the operation time is t comprises:

establishing a standard luminance curve of subpixels, the standard luminance curve being a graph of standard luminance and operation time T of the subpixels; and obtaining the standard luminance value of the subpixels according to the standard luminance curve when the operation time is t.

5. The luminance compensation method according to claim 1, wherein the step of comparing the minimum luminance value with the standard luminance value to obtain the compensated luminance value comprises:

comparing the minimum luminance value with the standard luminance value;

if the minimum luminance value is less than or equal to the standard luminance value, taking the standard luminance value as the compensated luminance value;

if the minimum luminance value is greater than the standard luminance value, taking the minimum luminance value as the compensated luminance value.

6. The luminance compensation method according to claim 1, wherein the step of comparing the minimum luminance value with the standard luminance value to obtain the compensated luminance value comprises:

comparing the minimum luminance value with the standard luminance value;

if the minimum luminance value is less than or equal to the standard luminance value, taking the standard luminance value as the compensated luminance value;

if the minimum luminance value is greater than the standard luminance value, obtaining a maximum luminance value among the luminance values of all the subpixels, and taking the maximum luminance value as the compensated luminance value.

7. The luminance compensation method according to claim 1, wherein the step of driving all the subpixels according to the compensated luminance value comprises:

obtaining a compensation coefficient $\alpha$ according to a ratio between the compensated luminance value and the luminance value of the subpixel;

$\alpha=L_t/L$, wherein $L_t$ is the compensated luminance value, and L is the luminance value of the subpixel;

obtaining a driving electrical performance parameter of the subpixel when the operation time is t;

multiplying the compensation coefficient and the driving electrical performance parameter to obtain a compensated driving electrical performance parameter;

adjusting a value of the driving electric performance parameter of the subpixel to a value of the compensated driving electric performance parameter.

8. The luminance compensation method according to claim 7, wherein the driving electric performance parameter includes any one of a driving voltage and a driving current of the subpixel.

9. A non-transitory computer readable storage medium, wherein a computer program executable in a processor is stored in the non-transitory computer readable storage medium, the processor executes the computer program to implement steps of a luminance compensation method comprising:

obtaining a luminance value of each of all subpixels when operation time is t;

obtaining a minimum luminance value from luminance values of all the subpixels;

obtaining a standard luminance value of the subpixels when the operation time is t;

comparing the minimum luminance value with the standard luminance value to obtain a compensated luminance value; and driving all the subpixels according to the compensated luminance value, wherein the step of obtaining the luminance value of the each of all the subpixels when the operation time is t comprises following steps:

dividing the operation time t of a subpixel into N time periods, wherein N is greater than or equal to 1;

obtaining a driving current value I of the subpixel in each of the time periods, and obtaining a total of N driving current values of the subpixel in the N time periods, which are respectively $I_1$, $I_2$, . . . and $I_N$;

converting the N driving current values into current stress values to obtain N current stress values, which are respectively $stress_{I1}$, $stress_{I2}$, . . . and $stress_{IN}$;

$stress_{IN}=\alpha\times stress_{ref}$, wherein $stress_{ref}$ is a current stress value of the subpixel at a reference current $I_{ref}$, $\alpha=I_N/I_{ref}$ or $\alpha=(I_N/I_{ref})^b$, b is a characteristic parameter of an organic light emitting device of the subpixel;

adding the N current stress values to obtain an accumulated value $sum_{stress}$; and obtaining a luminance value L of the subpixel according to the accumulated value $sum_{stress}$, $$L = e^{-\left(\frac{sum_{stress}}{\tau}\right)^{\beta}} \times L_0,$$

wherein $L_0$ is an initial luminance value of the subpixel, and $\beta$ and $\tau$ are characteristic parameters of the organic light emitting device of the subpixel.

10. A display device, wherein the display device comprises a processor, a memory, and a computer program stored in the memory and executable on the processor, the processor executes the computer program to implement steps of a luminance compensation method comprising:

obtaining a luminance value of each of all subpixels when operation time is t;

obtaining a minimum luminance value from luminance values of all the subpixels;

obtaining a standard luminance value of the subpixels when the operation time is t;

comparing the minimum luminance value with the standard luminance value to obtain a compensated luminance value; and driving all the subpixels according to the compensated luminance value, wherein the step of obtaining the luminance value of the each of all the subpixels when the operation time is t comprises following steps:

dividing the operation time t of a subpixel into N time periods, wherein N is greater than or equal to 1;

obtaining a driving current value I of the subpixel in each of the time periods, and obtaining a total of N driving current values of the subpixel in the N time periods, which are respectively $I_1$, $I_2$, . . . and $I_N$;

converting the N driving current values into current stress values to obtain N current stress values, which are respectively $stress_{I1}$, $stress_{I2}$, . . . and $stress_{IN}$;

$stress_{IN}=\alpha\times stress_{ref}$, wherein $stress_{ref}$ is a current stress value of the subpixel at a reference current $I_{ref}$, $\alpha=I_N/I_{ref}$ or $\alpha=(I_N/I_{ref})^b$, b is a characteristic parameter of an organic light emitting device of the subpixel;

adding the N current stress values to obtain an accumulated value $sum_{stress}$; and obtaining a luminance value L of the subpixel according to the accumulated value $sum_{stress}$, $$L = e^{-\left(\frac{sum_{stress}}{\tau}\right)^{\beta}} \times L_0,$$

wherein $L_0$ is an initial luminance value of the subpixel, and $\beta$ and $\tau$ are characteristic parameters of the organic light emitting device of the subpixel.

11. The display device according to claim 10, wherein the step of obtaining the driving current value I of the subpixel in the each of the time periods comprises:

obtaining M driving current values of the subpixel in the each of the time periods, wherein M is greater than or equal to 1; and obtaining an average driving current value of the M driving current values as the driving current value I of the subpixel in the each of the time periods.

12. The display device according to claim 10, wherein the step of obtaining the luminance value of the each of all the subpixels when the operation time is t comprises:

obtaining a driving electrical performance parameter of the subpixel; and obtaining a luminance value L of the subpixel according to the driving electric performance parameter, $$L = (c \times P + d) \times L_0$$

where $L_0$ is an initial luminance value of the subpixel, P is the driving electrical performance parameter, and c and d are characteristic parameters of the organic light emitting device of the subpixel.

13. The display device according to claim 10, wherein the step of obtaining the standard luminance value of the subpixels when the operation time is t comprises:

establishing a standard luminance curve of subpixels, the standard luminance curve being a graph of standard luminance and operation time T of the subpixels; and obtaining the standard luminance value of the subpixels according to the standard luminance curve when the operation time is t.

14. The display device according to claim 10, wherein the step of comparing the minimum luminance value with the standard luminance value to obtain the compensated luminance value comprises:

comparing the minimum luminance value with the standard luminance value;

if the minimum luminance value is less than or equal to the standard luminance value, taking the standard luminance value as the compensated luminance value;

if the minimum luminance value is greater than the standard luminance value, taking the minimum luminance value as the compensated luminance value.

15. The display device according to claim 10, wherein the step of comparing the minimum luminance value with the standard luminance value to obtain the compensated luminance value comprises:

comparing the minimum luminance value with the standard luminance value;

if the minimum luminance value is less than or equal to the standard luminance value, taking the standard luminance value as the compensated luminance value;

if the minimum luminance value is greater than the standard luminance value, obtaining a maximum luminance value among the luminance values of all the subpixels, and taking the maximum luminance value as the compensated luminance value.

16. The display device according to claim 10, wherein the step of driving all the subpixels according to the compensated luminance value comprises:

obtaining a compensation coefficient α according to a ratio between the compensated luminance value and the luminance value of the subpixel;

$\alpha = L_t/L$, wherein $L_t$ is the compensated luminance value, and L is the luminance value of the subpixel;

obtaining a driving electrical performance parameter of the subpixel when the operation time is t;

multiplying the compensation coefficient and the driving electrical performance parameter to obtain a compensated driving electrical performance parameter;

adjusting a value of the driving electric performance parameter of the subpixel to a value of the compensated driving electric performance parameter.

17. The display device according to claim 16, wherein the driving electric performance parameter includes any one of a driving voltage and a driving current of the subpixel.

* * * * *